US012617453B2

(12) United States Patent
Heo

(10) Patent No.: US 12,617,453 B2
(45) Date of Patent: May 5, 2026

(54) STEER BY WIRE TYPE STEERING APPARATUS

(71) Applicant: HL MANDO CORPORATION, Pyeongtaek-si (KR)

(72) Inventor: Seong Moo Heo, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 786 days.

(21) Appl. No.: 17/953,316

(22) Filed: Sep. 26, 2022

(65) Prior Publication Data

US 2023/0104562 A1      Apr. 6, 2023

(30) Foreign Application Priority Data

Sep. 30, 2021      (KR) ......................... 10-2021-0129437

(51) Int. Cl.
  *B62D 5/00*      (2006.01)
  *B62D 5/04*      (2006.01)
(52) U.S. Cl.
  CPC ........... *B62D 5/0478* (2013.01); *B62D 5/001* (2013.01)
(58) Field of Classification Search
  CPC .......... B62D 3/12; B62D 5/001; B62D 5/006; B62D 5/0403; B62D 5/0478; B62D 6/008
  USPC ........................................................ 180/402
  See application file for complete search history.

(56) References Cited

U.S. PATENT DOCUMENTS

| | | | |
|---|---|---|---|
| 2004/0245759 A1 | 12/2004 | Yamada et al. | |
| 2019/0185050 A1 | 6/2019 | Lee et al. | |
| 2021/0387665 A1 | 12/2021 | Seo | |

FOREIGN PATENT DOCUMENTS

| | | | | | |
|---|---|---|---|---|---|
| DE | 102 97 302 | | 7/2012 | | |
| DE | 10 2018 130 656 | | 6/2019 | | |
| DE | 10 2019 207 609 | | 11/2020 | | |
| DE | 11 2019 005 187 | | 9/2021 | | |
| JP | 2021107206 | A * | 7/2021 | | |
| JP | 2021112993 | A * | 8/2021 | | |
| KR | 20190115845 | A * | 10/2019 | ........... B62D 5/0415 |

OTHER PUBLICATIONS

Office Action dated Sep. 4, 2025 for German Patent Application No. 10 2022 124 796.1 and its English translation by Google Translate.

* cited by examiner

*Primary Examiner* — Alentin Neacsu
*Assistant Examiner* — Felicia L. Brittman-Alabi
(74) *Attorney, Agent, or Firm* — WOMBLE BOND DICKINSON (US) LLP

(57) ABSTRACT

A steer by wire type steering apparatus according to the present embodiments comprises a rotating shaft that rotates in conjunction with a steering shaft, a housing provided with a ball seating portion at one end and a ball is coupled and supported between the ball seating portion and an inner circumferential surface of the rotating shaft, a support member disposed inside the housing and provided with a protruding support portion for supporting the ball to one side in a circumferential direction while protruding in an axial direction, a ball support elastic member coupled to the housing and elastically supporting the ball to another side in the circumferential direction, and an actuator for moving the support member in the axial direction.

20 Claims, 11 Drawing Sheets

STEER BY WIRE TYPE STEERING APPARATUS

CROSS REFERENCE TO RELATED APPLICATION

This application claims the benefit and priority of Korean Patent Application No. 10-2021-0129437, filed on Sep. 30, 2021 in the Republic of Korea, the entire contents of all these applications being hereby expressly incorporated herein by reference into the present application.

BACKGROUND

Field of the Disclosure

Embodiments of the present disclosure relate to a steer by wire type steering apparatus, and more particularly, to a steer by wire type steering apparatus capable of mechanically stopping the steering wheel from rotating further when the rotation of the vehicle wheel reaches its maximum point and to a steer by wire type steering apparatus capable of providing steering reaction force even when an error occurs in a motor or electronic control device.

Description of the Related Art

In general, power steering has been developed and applied to a vehicle steering apparatus to provide convenience in driving operation by assisting a driver's operating force of a steering wheel. Power steering was developed and applied in hydraulic type using hydraulic pressure, electro-hydraulic type using hydraulic pressure and electric power of the motor at the same time, and electric type using only electric power of the motor.

Recently, instead of removing a mechanical connection device such as a steering column or a universal joint or a pinion shaft between the steering wheel and the vehicle wheel, the Steer By Wire (SBW) type steering apparatus for steering a vehicle using an electric motor has been developed and applied.

However, in the case of such a steer by wire type steering system, since there is no mechanical connection between the steering shaft and the vehicle wheels, the driver's steering wheel rotation can rotate indefinitely, thereby reducing the driver's steering feeling and steering stability.

In addition, in the steer by wire type steering system, when a malfunction or inability of a motor or an electronic control device occurs, a steering reaction force cannot be generated, thereby deteriorating the driver's steering feel and steering stability.

Therefore, when the rotation of the vehicle wheel reaches its maximum point (when the steering wheel or the vehicle wheel is in a full-turn state in a general steering system) , there is a need for research to prevent the steering wheel from rotating any more. Even if an error occurs in the motor or electronic control device, the need for research to prevent the driver's steering feeling and steering stability from being deteriorated is emerging.

SUMMARY OF THE DISCLSOURE

Embodiments of the present disclosure provide a steer by wire type steering apparatus capable of increasing a driver's steering feel and steering stability by preventing the steering wheel from mechanically rotating any more when the rotation of the vehicle wheel reaches the maximum point.

And embodiments of the present disclosure provide a steer by wire type steering apparatus capable of increasing a driver's steering feel and steering stability by generating a physical steering reaction force even if a motor or electronic control device malfunctions or fails.

In addition, the purpose of the embodiments of the present disclosure are not limited thereto, and other objects not mentioned will be clearly understood by those skilled in the art from the following description.

A steer by wire type steering apparatus according to the embodiments of the present disclosure may comprise a rotating shaft that rotates in conjunction with a steering shaft, a housing provided with a ball seating portion at one end and a ball is coupled and supported between the ball seating portion and an inner circumferential surface of the rotating shaft, a support member disposed inside the housing and provided with a protruding support portion for supporting the ball to one side in a circumferential direction while protruding in an axial direction, a ball support elastic member coupled to the housing and elastically supporting the ball to another side in the circumferential direction, and an actuator for moving the support member in the axial direction.

According to the embodiments of the present disclosure, there is provided a steer by wire type steering apparatus that increases a driver's steering feel and steering safety by preventing the steering wheel from mechanically rotating any more when the rotation of the vehicle wheel reaches the maximum point.

In addition, according to the embodiments of the present disclosure, there is provided a steer by wire type steering apparatus that increases a driver's steering feel and steering stability by generating a physical steering reaction force even if a motor or electronic control device malfunctions or fails.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
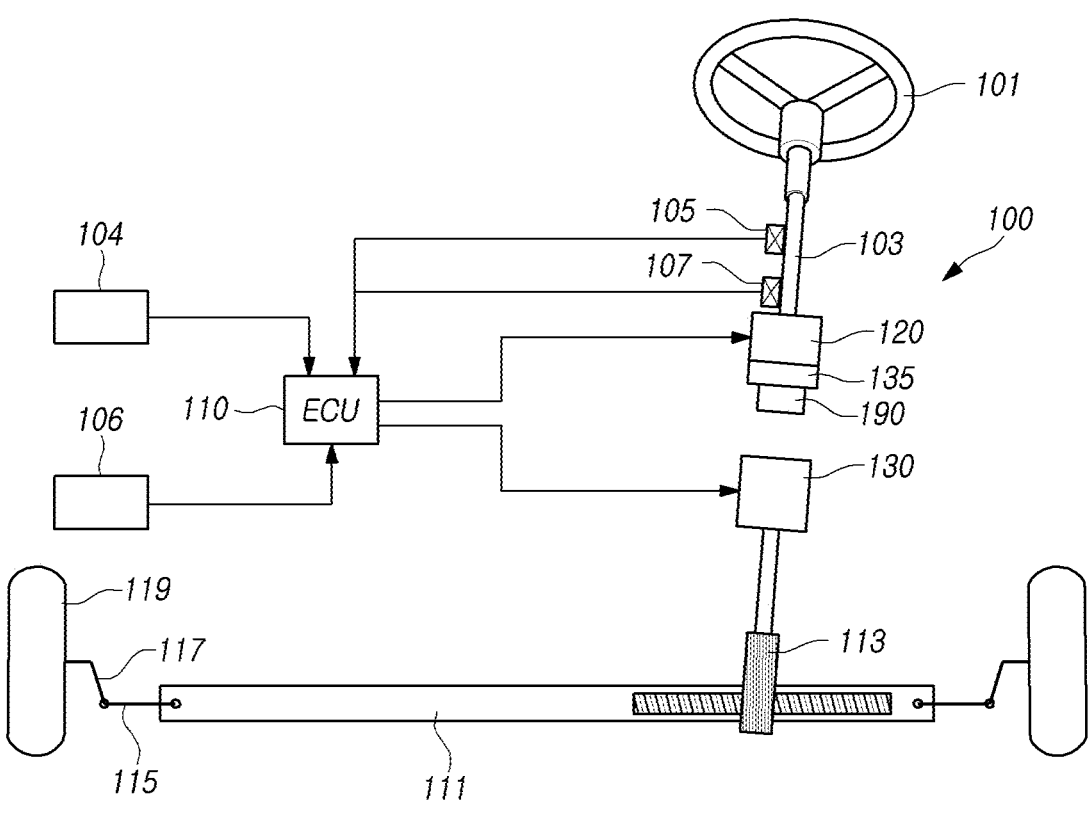
FIG. 1 is a schematic view illustrating a steer by wire type steering apparatus according to the embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms maybe used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
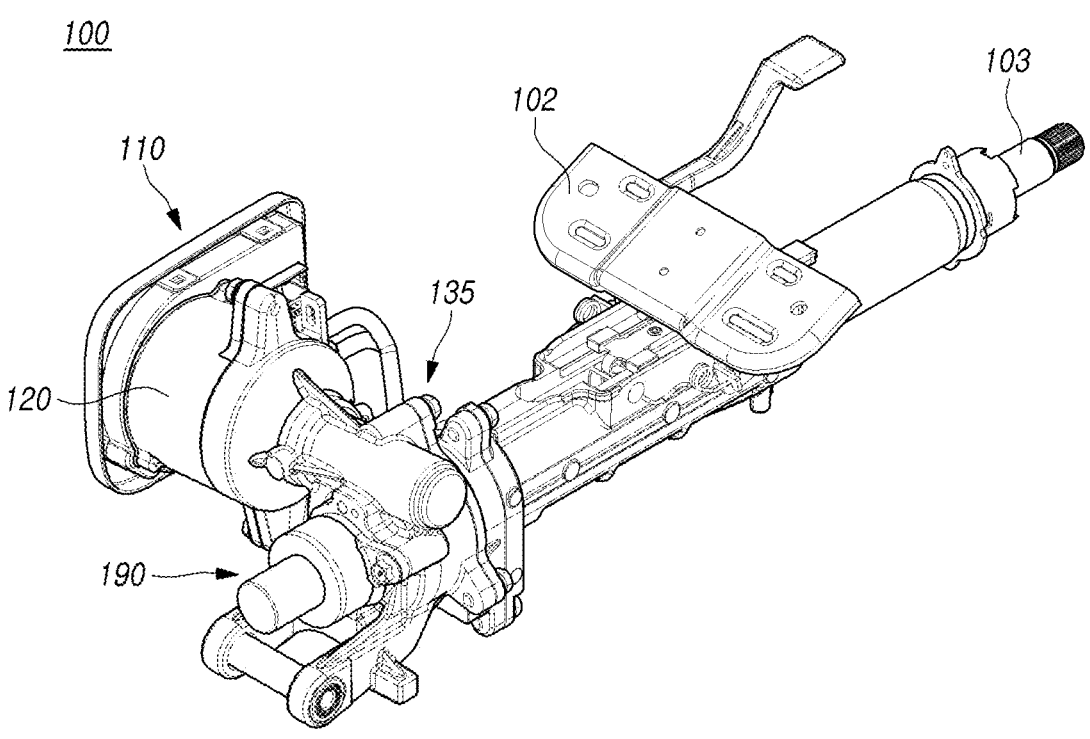
FIG. 2 is a perspective view illustrating a steer by wire type steering apparatus according to the embodiments of the present disclosure.
Figure 3:
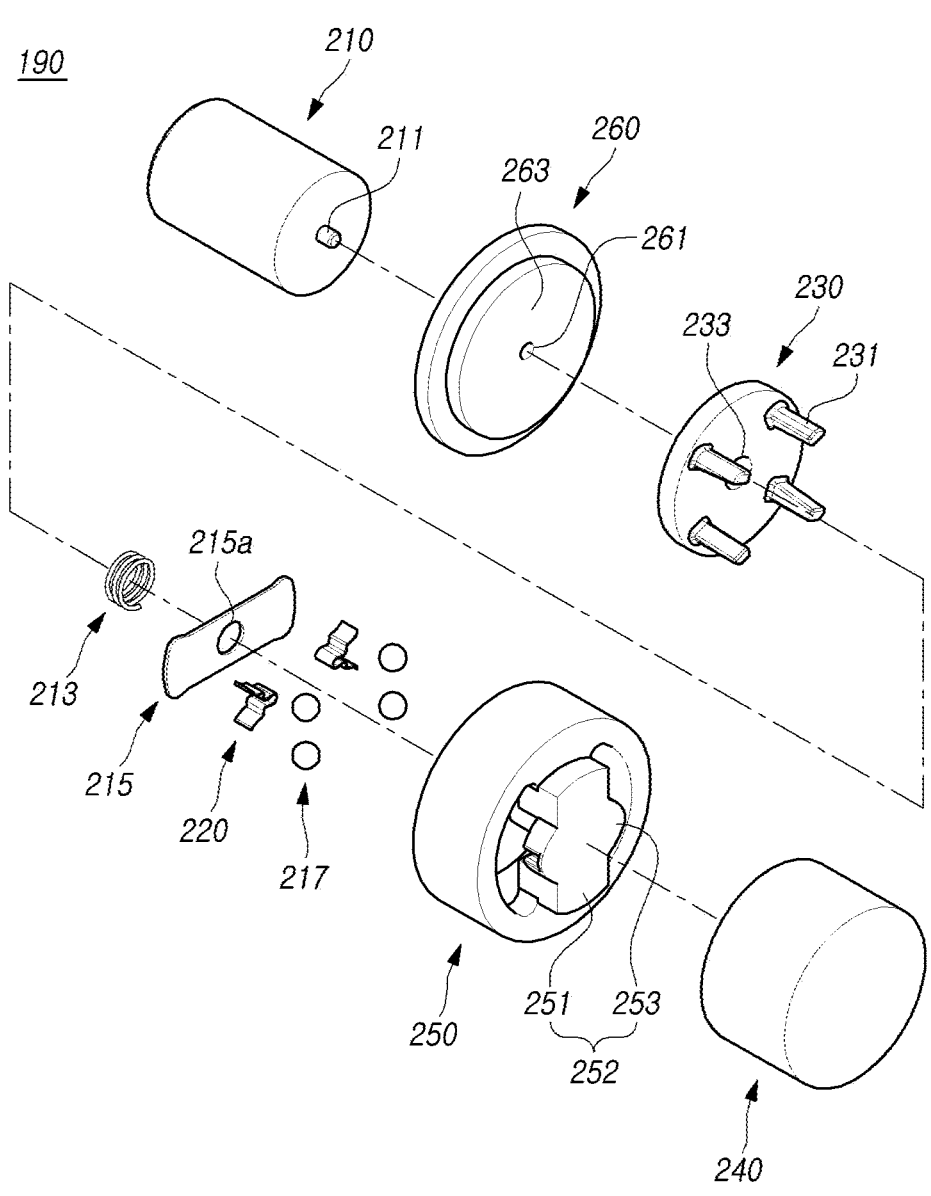
FIGS. 3 and 4 are exploded perspective views illustrating a steer by wire type steering apparatus according to the embodiments of the present disclosure.
Figure 4:
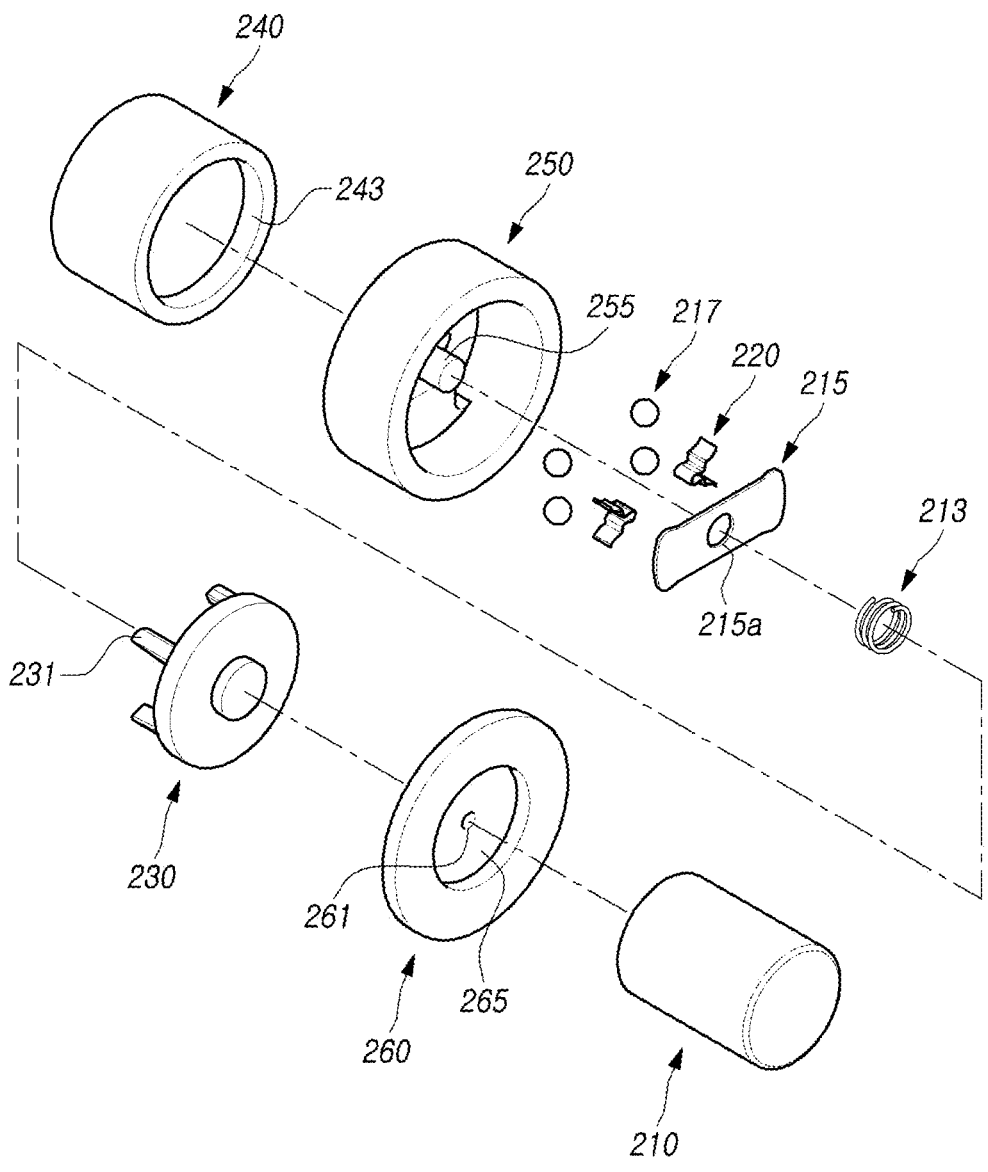
Figure 5:
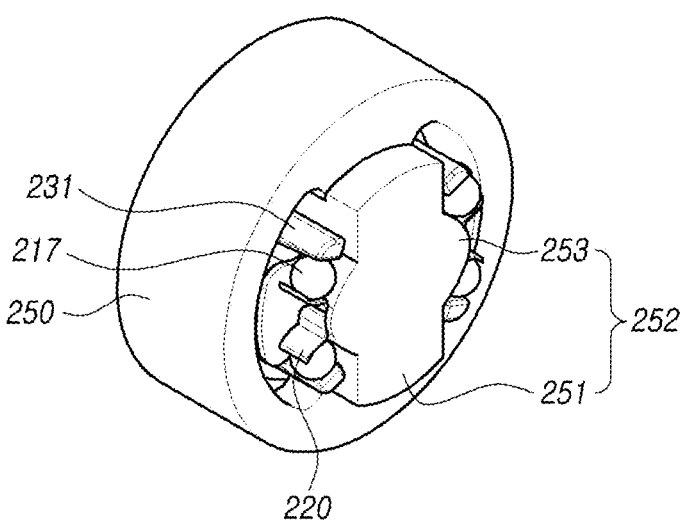
FIGS. 5 to 9 are perspective views illustrating a steer by wire type steering apparatus according to the embodiments of the present disclosure.
Figure 6:
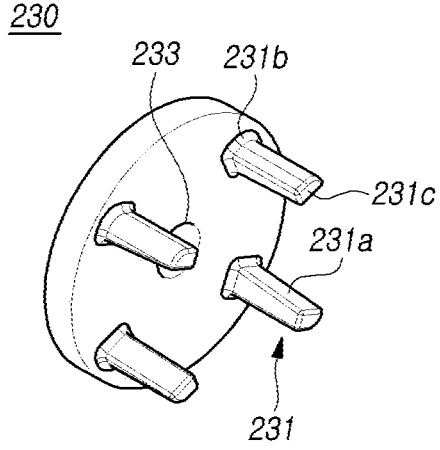
Figure 7:
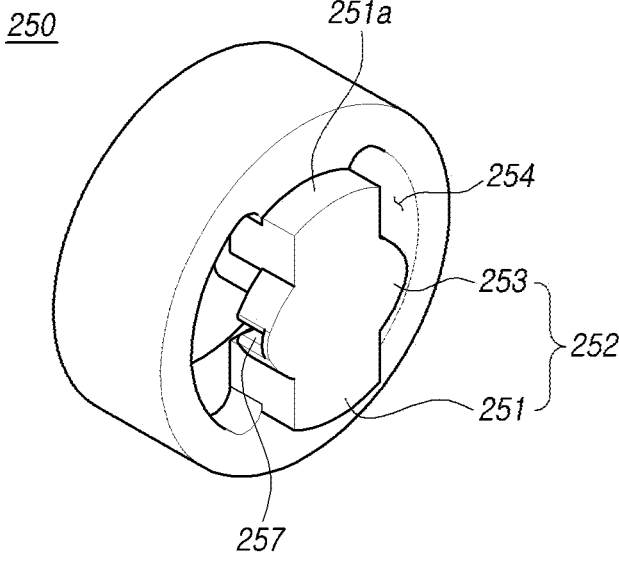
Figure 8:
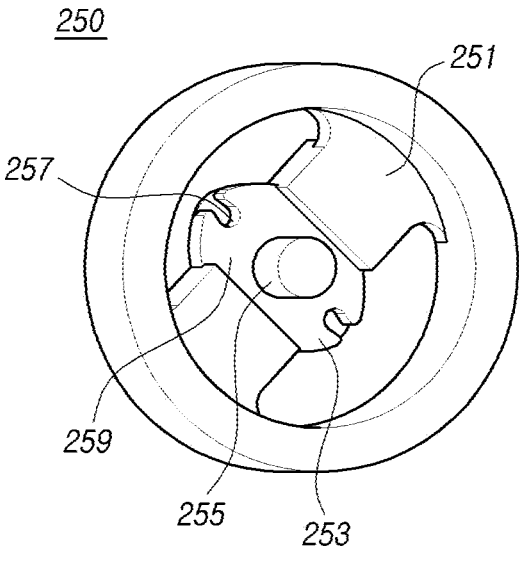
Figure 9:
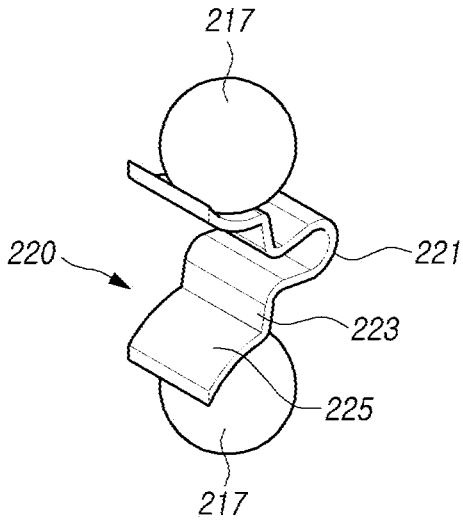
Figure 10:
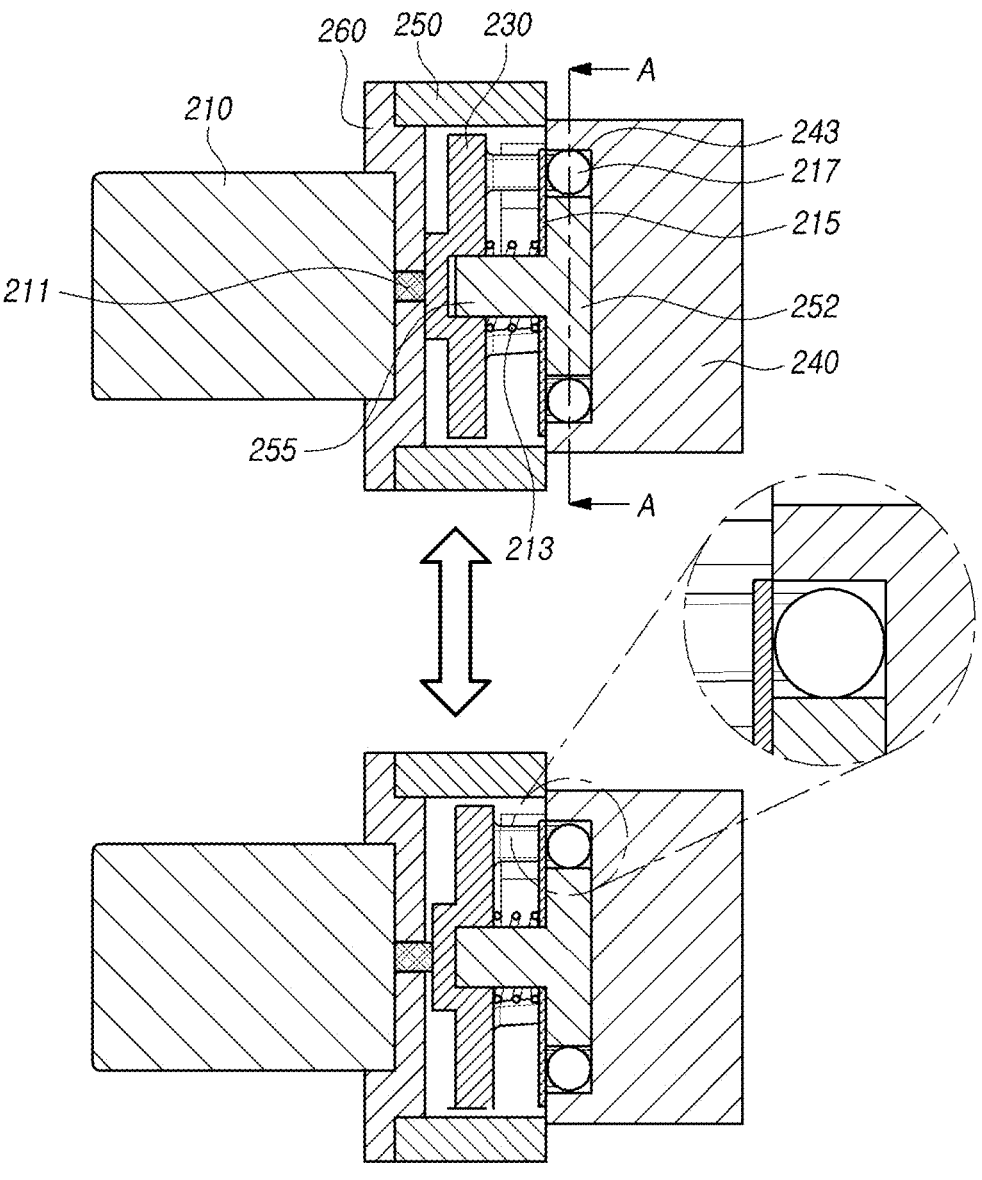
FIGS. 10 and 11 are cross-sectional views illustrating a steer by wire type steering apparatus according to the embodiments of the present disclosure.
Figure 11:
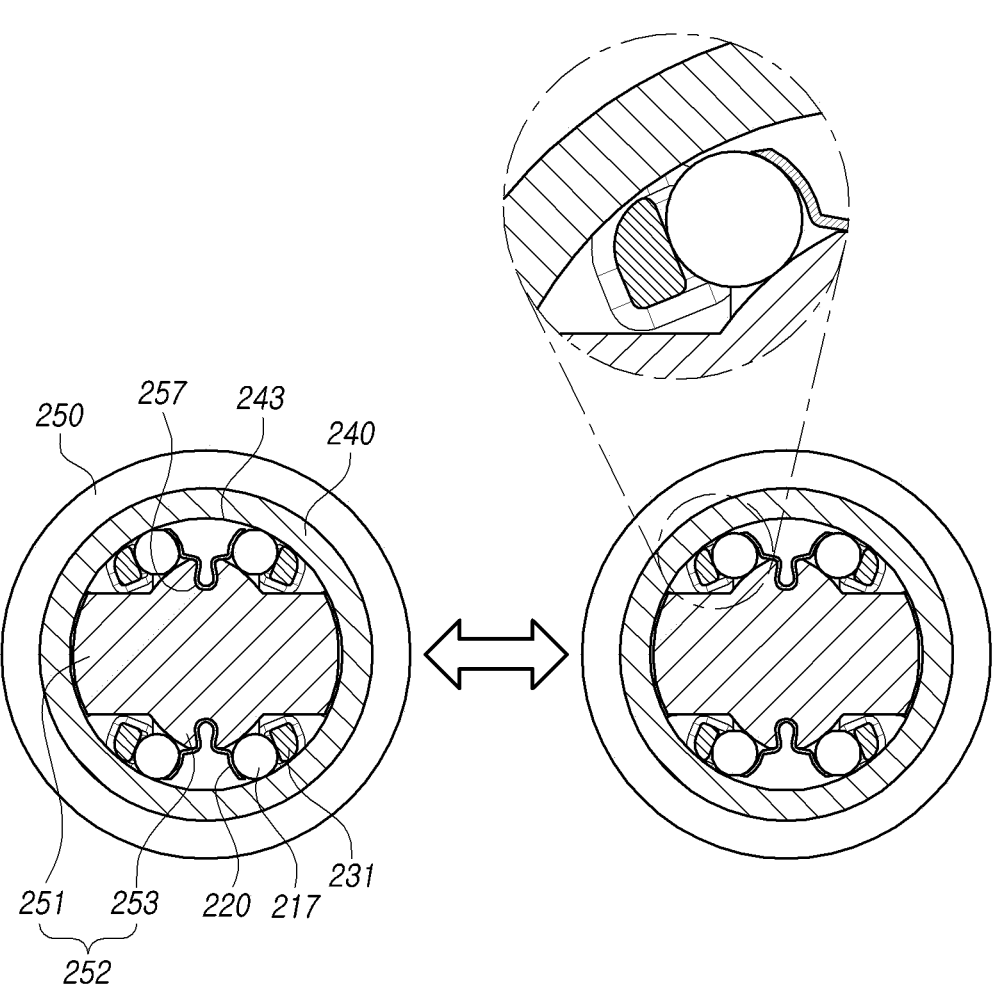

FIG. 1 is a schematic view illustrating a steer by wire type steering apparatus according to the embodiments of the present disclosure, FIG. 2 is a perspective view illustrating a steer by wire type steering apparatus according to the embodiments of the present disclosure, FIGS. 3 and 4 are exploded perspective views illustrating a steer by wire type steering apparatus according to the embodiments of the present disclosure, FIGS. 5 to 9 are perspective views illustrating a steer by wire type steering apparatus according to the embodiments of the present disclosure, FIGS. 10 and 11 are cross-sectional views illustrating a steer by wire type steering apparatus according to the embodiments of the present disclosure.

Referring to FIGS. 1 to 11, a steer by wire type steering apparatus according to the embodiments of the present disclosure may include a rotating shaft 240 that rotates in conjunction with a steering shaft 103, a housing 250 provided with a ball seating portion 252 at one end and a ball 217 is coupled and supported between the ball seating portion 252 and an inner circumferential surface of the rotating shaft 240, a support member 230 disposed inside the housing 250 and provided with a protruding support portion 231 for supporting the ball 217 to one side in a circumferential direction while protruding in an axial direction, a ball support elastic member 220 coupled to the housing 250 and elastically supporting the ball 217 to another side in the circumferential direction, and an actuator 210 for moving the support member 230 in the axial direction.

First, referring to FIG. 1, in the steer by wire type steering apparatus according to embodiments of the present disclosure, an angle sensor 105 and a torque sensor 107 are coupled to one side of a steering shaft 103 connected to the steering wheel 101, and the angle sensor 105 and the torque sensor 107 that detect the driver's manipulation of the steering wheel 101 send electrical signals to the electronic control device 110 to operate a steering shaft motor 120 and a pinion shaft motor 130.

The electronic control device 110 controls the steering shaft motor 120 and the pinion shaft motor 130 based on the electrical signals transmitted from the angle sensor 105 and the torque sensor 107 and the electrical signals transmitted from other sensors mounted on the vehicle.

The steering shaft motor 120 is connected to a speed reducer 135 for reducing the number of revolutions of the motor, and provides a reaction force to the steering shaft 103 so as to feel a steering reaction force in the opposite direction when the driver operates the steering wheel 101 during normal driving. And during autonomous driving, steering is performed by the control of the electronic control device 110 without the driver's will.

The pinion shaft motor 130 slides the rack bar 111 connected to the pinion shaft 113 to steer the vehicle wheels 119 on both sides through the tie rod 115 and the knuckle arm 117.

However, in the drawings in the embodiments of the present disclosure, for convenience of explanation, the angle sensor 105 and the torque sensor 107, a vehicle speed sensor 104 for transmitting steering information to the electronic control device 110, and a wheel rotation angle sensor 106 are illustrated as an example, but a motor position sensor, various radars, lidar, and image sensors such as cameras may be provided, and a detailed description thereof will be omitted below.

In such a steer by wire type steering apparatus, since the steering wheel 101 and the vehicle wheel 119 are not mechanically connected, when the driver manipulates the steering wheel 101, a mechanical restriction is required to stop the rotation of the steering wheel 101 at a certain angle.

That is, when the rotation of the vehicle wheel 119 reaches the maximum point (in a general steering device, when the steering wheel 101 or the vehicle wheel 119 is in a full-turn state) , a rotation angle limiting member 190 for mechanically limiting the rotation angle of the steering shaft 103 is provided so that the steering wheel 101 is not rotated any more. Thus, it provides the driver with an accurate steering feeling.

The rotation angle limiting member 190 may include a rotating shaft 240 provided at a lower end of a steering column 100 and rotating in association with a steering shaft 103, a housing 250 provided with a ball seating portion 252 to which a ball 217 is coupled and supported between the ball seating portion 252 and an inner circumferential surface of the rotating shaft 240, a support member 230 provided with a protruding support portion 231 for supporting the ball 217 in a circumferential direction, a ball support elastic member 220 coupled to the housing 250 to elastically support the ball 217 in the circumferential direction, and an actuator 210 for moving the support member 230 in the axial direction.

The rotating shaft 240 rotating in association with the steering shaft 103 may be coupled to the steering shaft 103 or formed integrally with the steering shaft 103. The rotation is stopped while the ball 217 is supported on an inner circumferential surface 243 of the end of the rotary shaft 240.

The rotating shaft 240 is configured to stop rotating while the ball 217 is supported on the inner circumferential surface 243 of an end in the direction connected to the housing 250. In addition, an inside except for the inner circumferential surface 243 of the rotating shaft 240 on which the ball 217 is supported is blocked so that the ball 217 is not separated.

The housing 250 coupled the rotating shaft 240 is coupled to and fixed to the reducer 135 provided at a lower end of the steering column 100. The ball seating portion 252 is provided in the housing 250 so that the ball 217 is coupled to and supported by the inner circumferential surface 243 of the rotating shaft 240.

The support member 230 disposed on the inside of the housing 250 is provided with a protruding support portion 231 protruding in the axial direction to support the ball 217 to one side in a circumferential direction and is moved in the axial direction by the actuator 210.

And, the ball support elastic member 220 coupled to the housing 250 supports the ball 217 to the other side in the circumferential direction.

The actuator 210 is coupled to the housing 250 to move the support member 230 in the axial direction. A surface 231a supporting the ball 217 of the protruding support portion 231 provided in the support member 230 is inclined in the axial direction.

Accordingly, the protruding support portion 231 is formed in a wedge shape in which a thickness of the protruding support portion 231 decreases toward an end in the axial direction.

That is, the protruding support portion 231 is formed in a tapered wedge shape that is gradually tapered from a portion 231b in contact with the support member 230 to a protruding end portion 231c.

Accordingly, when the support member 230 is moved in the axial direction by the actuator 210, the ball 217 moves to one side in the circumferential direction by the amount of change in the thickness of the protruding support portion 231.

The protruding support portion 231 is provided with two or more spaced apart in the circumferential direction, each protruding support portion 231 supports the ball 217 in the circumferential direction.

The ball seating portion 252 provided in the housing 250 is formed to protrude from an end of the housing 250 in the axial direction, and the ball seating portion 252 is disposed to be radially opposite to an inner circumferential surface 243 of the rotating shaft 240 on which the ball 217 is supported.

The ball seating portion 252 may include a connection portion 251 connecting one side and another side of an inner circumferential surface opposite to the housing 250, and a supporting end 253 protruding in both radial directions from a center of the connection portion 251 and spaced apart from an inner circumferential surface of the rotating shaft 240.

The housing 250 is formed in a substantially ring shape, and the connection portion 251 is formed to be radially connected to an inner circumferential surface of which the connection portion 251 is opposed to each other to the inner circumferential surface of one side in the axial direction. The supporting end 253 is formed to protrude from a center of the connection portion 251 to both sides perpendicular to the direction in which the connection portion 251 is connected.

The connection portion 251 and the supporting end 253 protrude from an end of the housing 250 in the axial direction and are formed on the same plane. The connection portion 251 and the supporting end 253 are disposed to face an inner circumferential surface 243 of the rotating shaft 240 on which the ball 217 is supported.

An opening opened in the axial direction is formed between the inner circumferential surface of the housing and the ball seating portion, and the protruding support portion 231 is disposed between an inner circumferential surface 243 of the rotating shaft 240 and the opening 254.

Accordingly, when the support member 230 moves in the axial direction by the actuator 210, the protruding support portion 231 moves in the axial direction through the opening 254 to support the ball 217 in the circumferential direction.

The supporting end 253 is formed in an arc shape in which the radius of curvature increases from a center of an outer circumferential surface toward the connection portions 251 on both sides, and is also moved in the radial direction when the ball 217 moves in the circumferential direction.

The distance from the center of the outer circumferential surface of the supporting end 253 to an inner circumferential surface 243 of the rotating shaft 240 is formed smaller than a diameter of the ball 217. In addition, a separation distance to an inner circumferential surface 243 of the rotating shaft 240 is gradually increased toward the both sides of the connection portion 251 and is formed to be larger than the diameter of the ball 217.

Accordingly, when the ball 217 moves toward the center of the outer circumferential surface of the supporting end 253, the rotation of the rotating shaft 240 stops while being supported by an inner circumferential 243 of the rotating shaft 240. On the contrary, when the ball 217 moves toward the connection portion 251, the rotating shaft 240 can be rotated while being spaced apart from the inner circumferential surface 243 of the rotating shaft 240.

When the support member 230 is moved toward the rotating shaft 240 by the actuator 210, the ball 217 moves toward the center of the outer circumferential surface of the supporting end 253. And, when the support member 230 moves toward the opposite actuator 210, the ball 217 moves toward the connection portion 251 in the circumferential direction by the elastic restoring force of the ball support elastic member 220.

The ball support elastic member 220 is coupled to a seating groove 257 formed in the center of the outer circumferential surface of the supporting end 253. Both ends of the ball support elastic member 220 elastically support the balls 217 on both sides in the circumferential direction to be in close contact with the protruding support portion 231.

The seating groove 257 is formed so that a lower side in the axial direction of the supporting end 253 is open and an upper side is blocked.

Accordingly, a lower side of the ball support elastic member 220 is supported by a fixing member 215 and an upper side is supported by the supporting end 253 and is fixed without being separated up and down.

The ball support elastic member may include an insertion portion 221 coupled to the seating groove 257, a bent portion 223 bent to both sides in the circumferential direction at the insertion portion 221, and a ball contact portion 225 bent toward an inner circumferential surface of the support member 230 in the bent portion 223 to surround an outer circumferential surface of the ball 217.

The insertion portion 221 is bent to become wider toward an inside of the seating groove 257, and the seating groove 257 is also formed to have a narrow entrance toward an outside in the radial direction. Therefore, the radial deviation of the insertion portion 221 is prevented.

The bent part 223 generates an elastic force in the circumferential direction based on an end of the insertion portion 221 and allows the ball contact portion 225 to move the ball 217. The ball contact portion 225 is formed in a curved surface surrounding the outer circumferential surface of the ball 217 to move the ball 217 in the circumferential direction from the outer circumferential surface of the supporting end 253.

A fixing groove 259 is formed on a lower side of the supporting end 253 so as to be stepped in the axial direction with the connection portion 251, a fixing member 215 for preventing separation of the ball support elastic member 220 is coupled to the fixing groove 259.

In addition, a guide portion 255 formed in the axial direction is provided below the supporting end 253, and a through hole 215a through which the guide portion 255 passes is provided in the fixing member 215.

So, the fixing member 215 is coupled to the fixing groove 259 through the through hole 215a and fixed, thereby maintaining the correct position of the ball support elastic member 220 and preventing separation.

Then, an axial support member 213 for elastically supporting between the fixing member 215 and the support member 230 in the axial direction is inserted into the guide part 255 and coupled thereto, and the support member 230 is restored to its original position in the axial direction.

That is, when the actuator 210 is operated, an operation rod 211 is protruded and the support member 230 is moved toward the rotating shaft 240 to stop the rotation. After that, when the operation rod 211 returns to the original position, the support member 230 moves toward the opposite actuator 210 by the elastic restoring force of the axial support member 213 and is restored to the original position. Then rotation of the rotating shaft 240 is possible.

In addition, an insertion groove 233 into which the guide portion 255 is inserted is provided in a center of the support member 230. So, when the support member 230 is moved in the axial direction, it is supported by the guide portion 255 and can be moved without being biased to either side.

A cover member 260 coupled to the housing 250 is provided between the support member 230 and the actuator 210 to prevent separation of the support member 230.

And, the cover member 260 is provided with an insertion end 263 inserted into the housing 250 on a surface opposite to the support member 230. In addition, the cover member 260 is provided with a coupling groove 265 into which the actuator 210 is inserted on a surface opposite to the actuator 210. Accordingly, the cover member 260 is coaxially coupled to the support member 230 and the actuator 210.

The cover member 260 is provided with a communication hole 261 passing through the insertion end 263 and the coupling groove 225 in the center, so that the operation rod 211 of the actuator 210 can support the support member 230 in the axial direction through the communication hole 261.

The steer by wire type steering apparatus according to the present embodiments as described above may include an angle sensor 108 for detecting a rotation angle of the steering wheel 101, and an electronic control device 110 for controlling whether to operate the actuator 210 by comparing the rotation angle of the steering wheel 101 transmitted from the angle sensor 105 with a preset angle.

The angle sensor 105 may be mounted on the steering shaft 103 or the steering wheel 101. The drawing shows a state mounted on the steering shaft 103 as an example, and the rotation angle of the steering wheel 101 detected by the angle sensor 105 is transmitted to the electronic control device 110.

Accordingly, when the driver's steering wheel manipulation angle reaches a preset angle, the operation rod 211 of the actuator 210 is controlled to protrude to stop the rotation of the steering wheel 101 and the steering shaft 103. And, when the steering wheel manipulation angle is reduced, the operation rod 211 of the actuator 210 is controlled to move to the original position, so that the steering wheel and the steering shaft 103 can be rotated.

As described above, according to the embodiments of the present disclosure, there is provided a steer by wire type steering apparatus that increases a driver's steering feel and steering safety by preventing the steering wheel from mechanically rotating anymore when the rotation of the vehicle wheel reaches the maximum point.

In addition, there is provided a steer by wire type steering apparatus that increases a driver's steering feel and steering stability by generating a physical steering reaction force even if a motor or electronic control device malfunctions or fails.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steer by wire type steering apparatus comprising:
   a rotating shaft that rotates in conjunction with a steering shaft;
   a housing provided with a ball seating portion at one end and a ball is coupled and supported between the ball seating portion and an inner circumferential surface of the rotating shaft;
   a support member disposed inside the housing and provided with a protruding support portion for supporting the ball to one side in a circumferential direction while protruding in an axial direction;
   a ball support elastic member coupled to the housing and elastically supporting the ball to another side in the circumferential direction; and
   an actuator for moving the support member in the axial direction.

2. The steer by wire type steering apparatus of claim 1, wherein the protruding support portion is formed in a wedge shape in which a surface supporting the ball is inclined in the axial direction and gradually decreases in thickness toward an end in the axial direction.

3. The steer by wire type steering apparatus of claim 1, wherein the protruding support portion is provided with two or more protruding support portions spaced apart in the circumferential direction, each of the two or more protruding support portions supports the ball in the circumferential direction.

4. The steer by wire type steering apparatus of claim 1, wherein the ball seating portion comprises:

a connection portion connecting one side and another side of an inner circumferential surface opposite to the housing; and a supporting end protruding in both radial directions from a center of the connection portion and spaced apart from the inner circumferential surface of the rotating shaft.

5. The steer by wire type steering apparatus of claim 4, wherein the connection portion and the supporting end protrude in the axial direction from an end of the housing, are formed on a same plane, and are disposed to face the inner circumferential surface of the rotating shaft.

6. The steer by wire type steering apparatus of claim 5, wherein an opening opened in the axial direction is formed between the inner circumferential surface of the housing and the ball seating portion.

7. The steer by wire type steering apparatus of claim 6, wherein the protruding support portion is disposed between the inner circumferential surface of the rotating shaft and the opening.

8. The steer by wire type steering apparatus of claim 7, wherein the supporting end is formed in an arc shape in which a radius of curvature increases from a center of an outer circumferential surface toward the connection portion on both sides.

9. The steer by wire type steering apparatus of claim 8, wherein a distance from the center of the outer circumferential surface of the supporting end to the inner circumferential surface of the rotating shaft is smaller than a diameter of the ball.

10. The steer by wire type steering apparatus of claim 9, wherein a seating groove is formed in the center of the outer circumferential surface of the supporting end, and the ball support elastic member is coupled to the seating groove so that both ends of the ball support elastic member elastically support the ball on both sides in the circumferential direction to closely contact the protruding support portion.

11. The steer by wire type steering apparatus of claim 10, wherein the seating groove is formed so that a lower side of the supporting end in the axial direction is open and an upper side of the supporting end is blocked.

12. The steer by wire type steering apparatus of claim 11, wherein the ball support elastic member comprises:

an insertion portion coupled to the seating groove;

a bent portion bent to both sides in the circumferential direction at the insertion portion; and a ball contact portion bent toward an inner circumferential surface of the support member in the bent portion to surround an outer circumferential surface of the ball.

13. The steer by wire type steering apparatus of claim 10, wherein a fixing groove is formed on a lower side of the supporting end, and a fixing member for preventing separation of the ball support elastic member is coupled to the fixing groove.

14. The steer by wire type steering apparatus of claim 13, wherein a guide portion formed in the axial direction is provided below the supporting end, and a through hole through which the guide portion passes is provided in the fixing member.

15. The steer by wire type steering apparatus of claim 14, wherein an axial support member for elastically supporting between the fixing member and the support member in the axial direction is inserted into the guide portion and coupled thereto.

16. The steer by wire type steering apparatus of claim 14, wherein an insertion groove into which the guide portion is inserted is provided at a center of the support member.

17. The steer by wire type steering apparatus of claim 1, wherein a cover member coupled to the housing is provided between the support member and the actuator.

18. The steer by wire type steering apparatus of claim 17, wherein the cover member is provided with an insertion end inserted into the housing on a surface opposite to the support member, and a coupling groove into which the actuator is inserted is provided on a surface opposite to the actuator.

19. The steer by wire type steering apparatus of claim 18, wherein the cover member is provided with a communication hole passing through the insertion end and the coupling groove in a central portion, and an operation rod of the actuator supports the support member in the axial direction through the communication hole.

20. The steer by wire type steering apparatus of claim 1, further comprising:

an angle sensor for detecting a rotation angle of the a steering wheel; and an electronic control device for controlling whether to operate the actuator by comparing the rotation angle of the steering wheel transmitted from the angle sensor with a preset angle.

* * * * *